United States Patent [19]

Ohuchida et al.

[11] Patent Number: 5,243,583
[45] Date of Patent: Sep. 7, 1993

[54] OPTICAL PICKUP DEVICE WITH DUAL GRATING ELEMENT

[75] Inventors: Shigeru Ohuchida, Zama; Yuji Sumi, Yokohama, both of Japan

[73] Assignee: Ricoh Company, Ltd., Tokyo, Japan

[21] Appl. No.: 504,341

[22] Filed: Apr. 3, 1990

[30] Foreign Application Priority Data

Apr. 6, 1989 [JP] Japan ................... 1-87313
Apr. 7, 1989 [JP] Japan ................... 1-89124
Apr. 28, 1989 [JP] Japan ................... 1-111833

[51] Int. Cl.$^5$ ............................... G11B 7/00
[52] U.S. Cl. ........................ 369/44.12; 369/44.23; 369/109
[58] Field of Search ............... 369/44.11, 44.12, 44.23, 369/44.24, 44.41, 44.42, 44.14, 112, 110, 109, 103; 250/201.5, 201.1; 359/566, 569, 571

[56] References Cited

U.S. PATENT DOCUMENTS

| | | | |
|---|---|---|---|
| 4,389,094 | 6/1983 | Roumiguieres et al. | 359/566 |
| 4,753,513 | 6/1988 | Shikama | 359/566 |
| 4,935,911 | 6/1990 | Ohuchida et al. | 369/44.37 |
| 4,983,002 | 1/1991 | Shikama | 359/566 |
| 5,007,708 | 4/1991 | Gaylord et al. | 359/566 |
| 5,015,835 | 5/1991 | Ohuchida et al. | 369/44.23 |
| 5,029,154 | 7/1991 | Sumi et al. | 369/112 |
| 5,060,212 | 10/1991 | Fujita et al. | 369/112 |

OTHER PUBLICATIONS

Japanese Patent Application Laying Open (Kokai) No. 61-230634.

Japanese Patent Application No. 63-1518.

*Primary Examiner*—Jeffery A. Brier
*Assistant Examiner*—Thai Tran
*Attorney, Agent, or Firm*—Cooper & Dunham

[57] ABSTRACT

In an apparatus for recording and reproducing optical information, light emitted from a laser beam source is irradiated to an optical information recording medium to record the optical information and the light reflected from the recording medium is guided to a signal detecting optical system to detect tracking and focusing error signals and a reproducing signal. The apparatus comprises a dual grading arranged through a detecting lens on an optical path on which the light reflected from the recording medium is guided to the optical system, the dual grating having diffraction gratings formed at an equal pitch on the front and rear faces of a substrate, a refractive index of the substrate being greater than the refractive indexes of the diffraction gratings; and a photodetector for detecting light transmitted through the dual grating. The dual grating may have diffraction gratings respectively formed at equal and irregular pitches on both faces of a substrate. The dual grating may have a front face grating formed on a first incident side of the reflected light and a rear face grating formed on the side of a substrate opposite to the first incident side; the front face grating having a pitch smaller than that of the rear face grating; an incident angle of the reflected light with respect to the front face grating being set to be greater than a Bragg angle with respect to the front face grating.

8 Claims, 8 Drawing Sheets

(TO COLLIMATOR LENS)   (TO SEMICONDUCTOR LASER)

OPTICAL PICKUP DEVICE WITH DUAL GRATING ELEMENT

BACKGROUND OF THE INVENTION

1. Field of the Invention

The present invention relates to an apparatus for recording and reproducing optical information in which a focusing error signal and a tracking error signal are detected by using light reflected from an optical information recording medium. The present invention also relates to an optical pickup device using a dual grating to detect a signal with respect to the light reflected from the optical information recording medium.

2. Description of the Related Art

In a first proposed example of an apparatus for recording and reproducing optical information, the apparatus is applicable when a compact disk, an optical disk or a write-once type, etc. are used as an optical information recording medium. However, this apparatus has no function for detecting a signal recorded onto a magnetooptic disk. Further, in this apparatus, a diffraction angle is changed in accordance with the change in wavelength of light, which is a fundamental disadvantage caused by a grating itself such as a polarizing beam splitter grating, a ¼ wavelength plate grating, etc.

As a second proposed example, there is an optical information recording-reproducing apparatus which can also correspond to a magnetooptic disk. However, in this case, since a dual grating having gratings formed on the front and rear faces of a substrate is used, a difference in optical path is caused between zeroth and first order lights when light is transmitted through this dual grating. In particular, this difference in optical path is increased as the thickness of the substrate is increased. Therefore, when two light spots are detected on the same plane, the spot of the first order light is greater in size than that of the zeroth order light so that it is necessary to dispose a large-sized light-receiving element. When the thickness of the substrate is decreased, the difference in optical path can be reduced and the size of the spot of the first order light is not increased. However, the generating amount of aberration is reduced with respect to the zeroth order light so that it is very difficult to detect a focusing error signal by an astigmatic method.

Further, in the above-mentioned apparatus in the second example, the number of optical parts disposed in a lighting optical system with respect to the light emitted from a semiconductor laser to the magnetooptic disk is increased so that the entire apparatus cannot be made compact and light.

In an optical pickup device using a dual grating having gratings on the front and rear faces thereof, it is possible to dispose light-receiving elements for signal detection in the same place. Therefore, the pickup device can be made compact and light and can be operated irrespective of the change in wavelength of light. However, since light is transmitted twice through the gratings, light utilization efficiency and diffracted wave efficiency are reduced in comparison with those in a structure in which light is transmitted once through the gratings, thereby causing problems about stability in signal detection.

SUMMARY OF THE INVENTION

It is therefore a first object of the present invention to provide an apparatus for recording and reproducing optical information in which the reduction of diffraction efficiency can be prevented and no large-sized light-receiving element is required.

A second object of the present invention is to provide an apparatus for recording and reproducing optical information in which the difference in optical path between zeroth and first order lights can be reduced and the apparatus can correspond to an arbitrary difference in optical path.

A third object of the present invention is to provide an optical pickup device using a dual grating in which light utilization efficiency is improved.

A fourth object of the present invention is to provide an apparatus for recording and reproducing optical information in which the number of parts can be greatly reduced and the entire apparatus can be made compact and light and the cost thereof can be reduced.

The above first object of the present invention can be achieved by an apparatus for recording and reproducing optical information in which light emitted from a laser beam source is irradiated to an optical information recording medium so as to record the optical information and the light reflected from the optical information recording medium is guided to a signal detecting optical system so as to detect a tracking error signal, a focusing error signal and a reproducing signal, the apparatus comprising a dual grating arranged through a detecting lens on an optical path on which the light reflected from the optical information recording medium is guided to the signal detecting optical system, the dual grating having diffraction gratings formed at an equal pitch on the front and rear faces of a substrate, a refractive index of the substrate being greater than the refractive indexes of the diffraction gratings; and a photodetector for detecting light transmitted through the dual grating.

In the above first embodiment of the present invention, the light reflected from the optical information recording medium is transmitted through the substrate having diffraction gratings formed at an equal pitch on the front and rear faces thereof and having a refractive index greater than the refractive indexes of the diffraction gratings. Thus, it is possible to reduce the difference in optical path between zeroth and first order lights of the light transmitted through the substrate, thereby preventing diffraction efficiency from being reduced.

The above second object of the present invention can be achieved by an apparatus for recording and reproducing optical information in which light emitted from a laser beam source is irradiated to an optical information recording medium so as to record the optical information and the light reflected from the optical information recording medium is guided to a signal detecting optical system so as to detect a tracking error signal, a focusing error signal and a reproducing signal, the apparatus comprising a dual grating arranged through a detecting lens on an optical path on which the light reflected from the optical information recording medium is guided to the signal detecting optical system, the dual grating having a diffraction grating formed at an equal pitch on one face of a substrate and a diffraction grating formed at an irregular pitch on the other face of the substrate; and a photodetector for detecting light transmitted through the dual grating.

In the above second embodiment of the present invention, the light reflected from the optical information recording medium is transmitted through diffraction gratings formed at equal and irregular pitches on the front and rear faces of a substrate. Thus, it is possible to reduce the difference in optical path between zeroth and first order lights by a concave lens action provided by the diffraction grating having the irregular pitch.

In the above apparatus in the second embodiment, a refractive index of the substrate may be greater than that of the diffraction grating.

In this third embodiment of the present invention, the light reflected from the optical information recording medium is transmitted through the diffraction grating having the irregular pitch and the substrate having a refractive index greater than that of this diffraction grating. Thus, it is possible to easily correct the difference in optical path between zeroth and first order lights.

The above third object of the present invention can be achieved by an optical pickup device for irradiating light emitted from a laser beam source to an optical information recording medium so as to record and reproduce information, the optical pickup device guiding the light reflected from the optical information recording medium to a signal detecting optical system so as to detect a focusing error signal, a tracking error signal, etc., the device comprising a dual grating arranged through a condenser lens on an optical path of the reflected light guided to the signal detecting optical system; a front face grating formed in the dual grating on a first incident side of the reflected light; a rear face grating formed in the dual grating on the side thereof opposite to the first incident side; the front face grating having a pitch smaller than that of the rear face grating; an incident angle of the reflected light with respect to the front face grating being set to be greater than a Bragg angle with respect to the front face grating; and a light-receiving element for detecting transmitted and diffracted lights divided by the operation of the dual grating.

In the above fourth embodiment of the present invention, the light reflected from the optical information recording medium is incident to the front face grating having a pitch different from that of the rear face grating at an incident angle slightly shifted from the Bragg angle with respect to the front face grating. Accordingly, the reflected light is incident to the rear face grating in a state in which this incident angle is slightly shifted from a Bragg angle with respect to the rear face grating. Thus, the combined diffraction efficiency of the light transmitted through the dual grating can be set to be high in comparison with that in the case in which the light is incident to the gratings in a state in which the pitches of the front and rear face gratings are equal to each other and the incident angle is equal to the Bragg angle.

The above fourth object of the present invention can be achieved by an apparatus for recording and reproducing optical information in which light emitted from a laser beam source is converged by an objective lens to form a light spot and is irradiated to an optical information recording medium so as to record the optical information and the light reflected from the optical information recording medium is guided to a signal detecting optical system so as to detect a tracking error signal, a focusing error signal and a reproducing signal, the apparatus comprising optical path separating means arranged on an optical path on which the light emitted from the laser beam source is guided to the optical information recording medium; the optical path separating means having a semi-transmission type diffraction grating having an irregular pitch and formed on one face of a substrate located on the side of the laser beam source, the optical path separating means having a transmission type diffraction grating formed on the other side of the substrate and having an equal pitch; a collimator lens disposed on an optical path between the optical path separating means and the optical information recording medium; and a photodetector disposed on an optical path on which the light reflected from the optical information recording medium is transmitted through the optical path separating means, the photodetector detecting zeroth and first order lights formed on this optical path by transmitting the reflected light through the optical path separating means.

In the above fifth embodiment of the present invention, the light emitted from the laser beam source is reflected by the semi-transmission type diffraction grating having an irregular pitch in the optical path separating means and is changed to parallel light by the collimator lens. This parallel light is irradiated through a condenser lens to the optical information recording medium. Thereafter, the light reflected from the optical information recording medium is again guided to the optical path separating means and is separated into zeroth and first order lights through the semi-transmission type diffraction grating having the irregular pitch. Then, the separated lights are externally emitted through the transmission type diffraction grating having an equal pitch and are then detected by the photodetector, thereby detecting the focusing error signal, the reproducing signal, etc.

Further objects and advantages of the present invention will be apparent from the following description of the preferred embodiments of the present invention as illustrated in the accompanying drawings.

BRIEF DESCRIPTION OF THE DRAWINGS

FIG. 2b is a circuit diagram of a photodetector in FIG. 2a;

DESCRIPTION OF THE PREFERRED EMBODIMENTS

The preferred embodiments of an apparatus for recording and reproducing optical information in the present invention will next be described in detail with reference to the accompanying drawings.

Japanese Patent Application Laying Open (KOKAI) No. 61-230634 shows a first proposed example of an apparatus for recording and reproducing optical information. The construction of this apparatus will next be described with reference to FIG. 1. Light emitted from a semiconductor laser 1 is changed by a collimator lens 2 to parallel light. This parallel light is incident to a polarizing beam splitter grating 3. In this grating 3, a polarizing direction of the incident beam 4 is set such that an electric vector of the polarizing direction is parallel to a groove of the polarizing beam splitter grating 3. Accordingly, the above parallel light is changed to diffracted light 5 and is incident to a ¼ wavelength plate grating 6. Thus, the diffracted light is changed to a circularly polarized light beam and is converged by a lens 7 and is irradiated onto a surface of an optical disk 8 as an optical information recording medium. Light reflected from the optical disk 8 is changed to a linearly polarized light by the above ¼ wavelength plate grating 6. The linearly polarized light is then changed to zeroth order diffracted light 9 through the polarizing beam splitter grating 3 and is incident to a critical angle diffraction grating 10. The light incident to the critical angle diffraction grating 10 is diffracted at a critical angle and totally reflected twice. The incident light is then changed to diffracted light 11 and is detected by a four-divided photodetector 12. Thus, a focusing error signal is detected by a difference signal with respect to right-hand and left-hand light-receiving faces of the photodetector 12. A tracking error signal is detected by a difference signal with respect to light-receiving faces of the photodetector 12 in a direction perpendicular to a paper face of this drawing.

Figure 2A:
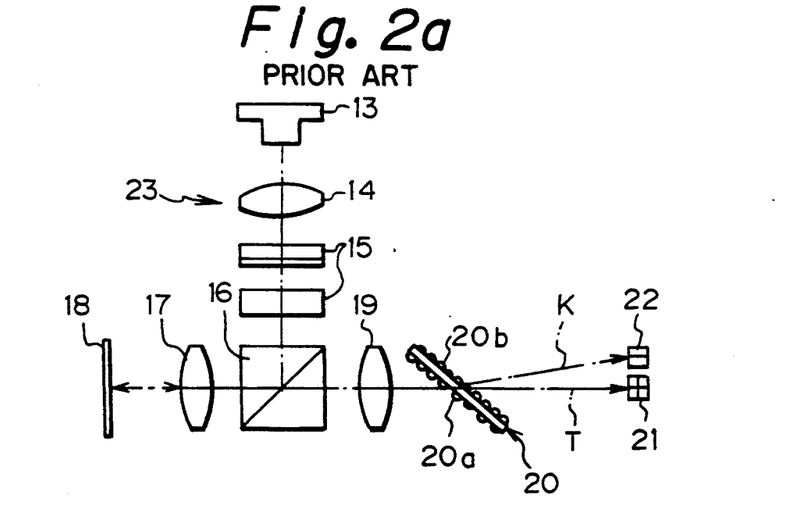
FIG. 2a is a view showing an apparatus for recording and reproducing optical information in a second proposed example.

Japanese Patent Application No. 63-1518 shows a second example of the optical information recording-reproducing apparatus proposed by the same applicant as that in this application. The construction of this apparatus is shown in FIG. 2a. In this figure, light emitted from a semiconductor laser 13 is changed to parallel light by a collimator lens 14 and is reflected by a beam splitter 16 through beam shaping prisms 15. The reflected light is converged by an objective lens 17 and is irradiated onto a face of a magnetooptic disk 18 to record information. Light reflected from the magnetooptic disk 18 is converged by a detecting lens 19 through the above beam splitter 16 and is then guided to a dual grating 20. This dual grating 20 has gratings 20a and 20b formed on the front and rear faces thereof and having diffraction efficiencies different from each other with respect to the polarizing direction. When the light is transmitted through these two gratings 20a and 20b, the light is separated into zeroth order light T and first order light K. The zeroth order light T and the first order light K are respectively guided to a four-divided light-receiving element 21 and a two-divided light-receiving element 22. A magnetooptic signal is detected by the difference in quantity of light between the zeroth order light T and the first order light K. A focusing error signal can be detected by the zeroth order light T by using an astigmatic method and a tracking error signal can be detected by the first order light K.

Figure 1:
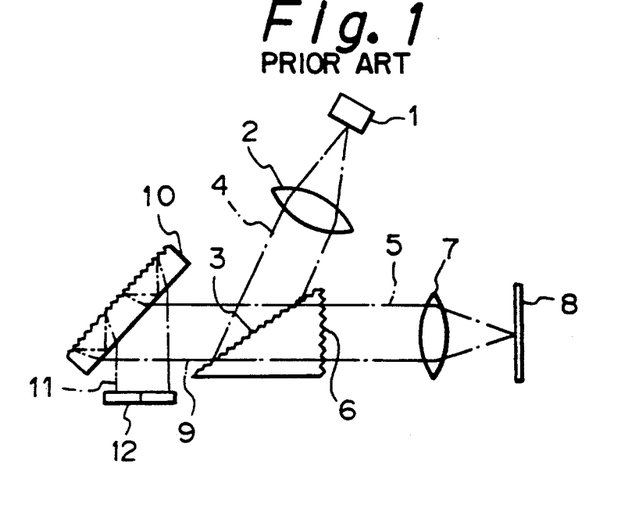
FIG. 1 is a view showing the construction of an apparatus for recording and reproducing optical information in a first proposed example.

In the first proposed example, the optical information recording-reproducing apparatus is applicable when a compact disk, the optical disk 8 of a write-once type, etc. are used as the optical information recording medium. However, this apparatus has no function for detecting a signal recorded onto the magnetooptic disk. Further, in this apparatus, a diffraction angle is changed in accordance with the change in wavelength, which is a fundamental disadvantage caused by a grating itself such as the polarizing beam splitter grating 3, the ¼ wavelength plate grating 6, etc.

In the second proposed example, the optical information recording-reproducing apparatus can also correspond to the magnetooptic disk 18. However, in this case, since the dual grating 20 having the gratings 20a and 20b formed on the front and rear faces of the substrate is used, a difference in optical path is caused between the zeroth order light T and the first order light K when the light is transmitted through this dual grating 20. In particular, this difference in optical path is increased as the thickness of the substrate is increased. Therefore, when two light spots are detected on the same plane, the spot of the first order light K is greater in size than that of the zeroth order light T so that it is necessary to dispose a large-sized light-receiving element. When the thickness of the substrate is decreased, the difference in optical path can be reduced and the size of the spot of the first order light K is not increased. However, the generating amount of aberration is reduced with respect to the zeroth order light T so that it is very difficult to detect the focusing error signal by the astigmatic method.

The optical information recording-reproducing apparatus in the second proposed example can correspond to the optical disk 8 as well as the magnetooptic disk 18 and is constructed by using the dual grating 20 having the gratings 20a and 20b formed on the front and rear faces of the substrate. In this apparatus, it is possible to greatly reduce the shift in position of a light spot with respect to the change in wavelength.

However, in this apparatus, similar to the above-mentioned optical pickup device, the number of optical parts disposed in the lighting optical system 23 with respect to the light emitted from the semiconductor laser 13 to the magnetooptic disk 18 is increased so that the entire apparatus cannot be made compact and light.

Figure 3:
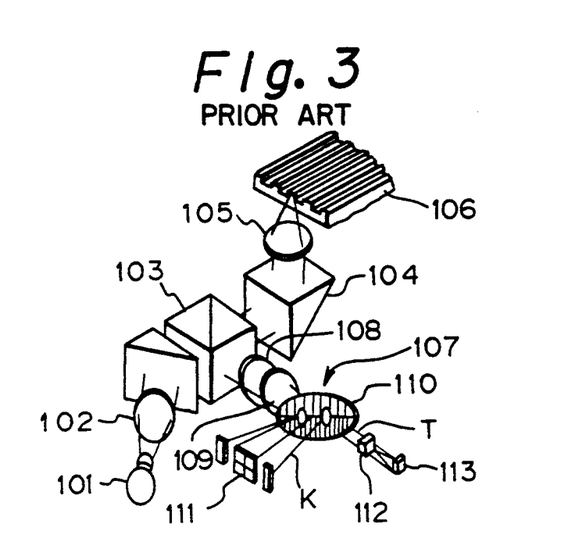
FIG. 3 is a view showing the construction of a general optical pickup device as an example.

FIG. 3 shows an example in which a grating is used to detect a focusing error signal and a tracking error signal. Light emitted from a semiconductor laser 101 is changed by a collimator lens 102 to a parallel light beam and is transmitted through a beam splitter 103 and a mirror 104. The light beam is then converged by an objective lens 105 and is irradiated onto a surface of a magnetooptic disk 106 as an optical information recording medium so as to record information, etc. The light reflected from the magnetooptic disk 106 is reflected by the beam splitter 103 and is guided to a signal detecting optical system 107. The reflected light guided to this signal detecting optical system 107 is rotated 45° by a ½ wavelength plate 108 with respect to a polarizing direction of this light and is changed to converged light by a condenser lens 109. Thereafter, this converged light is incident to a HOE (Holographic Optical Element) 110 and is separated into diffracted light K and transmitted light T by four kinds of different holograms formed on a surface of the HOE 110. At this time, the diffracted light K is separated into four lights and is guided to a six-divided light-receiving element 111. On the other hand, the transmitted light T transmitted as it is without any influence of the HOE 110 is transmitted through a polarizing prism 112 and is then guided to a two-divided light-receiving element 113.

Figure 4:
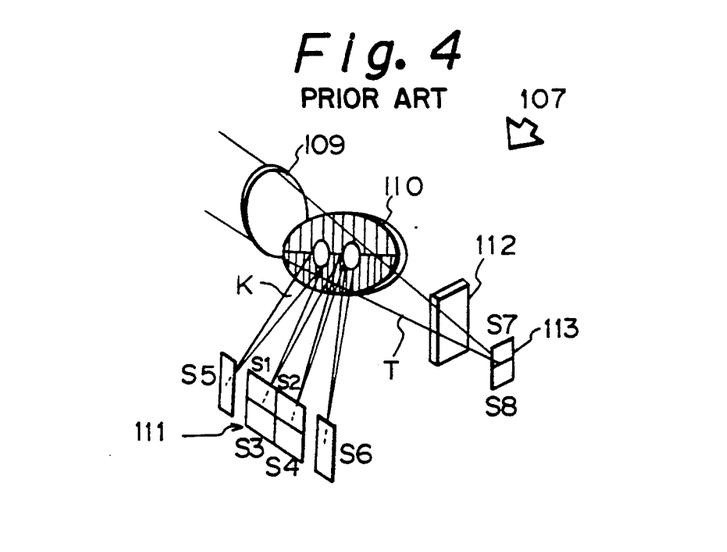
FIG. 4 is a view showing an optical path of a signal detecting optical system of the optical pickup device in FIG. 3.
Figure 5A:
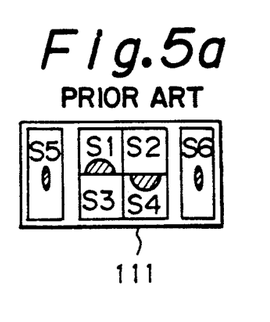
FIGS. 5a to 5c are explanatory views showing the principle for detecting a focusing error signal.
Figure 5B:
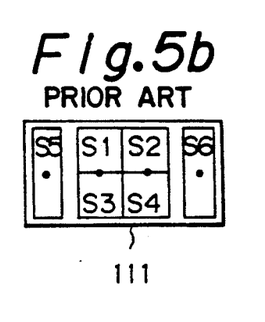
Figure 5C:
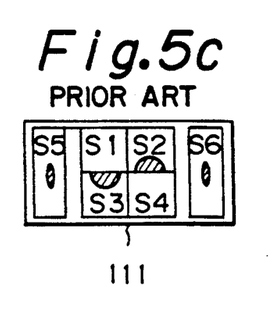

In this case, with respect to respective signals within the signal detecting optical system 107, a magnetooptic signal, a tracking error signal and a focusing error signal can be respectively detected by $(S_7-S_8)$, $(S_5-S_6)$ and $(S_5+S_6)-(S_5+S_6)$ in FIGS. 4 and 5. FIGS. 5a to 5c show the change in shape of a light spot irradiated to the light-receiving element 111 in accordance with a focusing state of the magnetooptic disk 106. FIG. 5b shows a state in which the magnetooptic disk 106 is focused. At this focusing time, the difference in quantity of light becomes zero and no focusing error signal is detected. FIGS. 5a and 5c respectively show defocusing states of the magnetooptic disk 106 before and after the focusing state thereof. In such defocusing states of the magnetooptic disk 106, the difference in quantity of light does not become zero so that the focusing error signal is detected.

Thus, the optical pickup device can be made compact and light by utilizing an optical element for signal detection using a grating which has a function for detecting the focusing error signal and the tracking error signal and a polarization separating function for detecting the magnetooptic signal.

In the above-mentioned device, the light emitted from the semiconductor laser 101 is changed in wavelength in accordance with the change in temperature, etc. A diffraction angle of the diffracted light incident to the grating (hologram) of the HOE 110 is changed in accordance with this change in wavelength. Accordingly, in this case, in a structure in which six light-receiving elements 111 are arranged on the side of the diffracted light, there is a fear that the diffracted light K is not converged in a predetermined position by the above change in wavelength. When the shift in position of the diffracted light K is caused, there is a fear that the focusing error signal, the tracking error signal and the magnetooptic signal cannot be accurately detected, thereby reducing reliability in signal detection.

Further, in the above-mentioned device, since the HOE 110 has no convergent ability, it is necessary to dispose a condenser lens 109 having a convergent function on an optical path of the signal detecting optical system 107. Further, it is necessary to dispose the HOE 110 on an optical path of the converged light provided by the condenser lens 109 and eight light-receiving elements 111, 113 as a total in predetermined positions on the sides of the diffracted and transmitted lights. Therefore, a considerable accuracy in assembly of these members and a great deal of labor are required so that productive efficiency is reduced.

It is possible to dispose the light-receiving elements for signal detection in the same place in an optical pickup device using a dual grating having gratings on the front and rear faces thereof except for the device using the HOE 110 as mentioned above. Therefore, the pickup device can be made compact and light so that the pickup device can be operated irrespective of the change in wavelength. However, since light is transmitted twice through the gratings, light utilization efficiency and diffracted wave efficiency are reduced in comparison with those in a structure in which light is transmitted once through the gratings, thereby causing problems about stability in signal detection.

An apparatus for recording and reproducing optical information in a first embodiment of the present invention will next be described in detail with reference to FIG. 6. Here, the description about the entire construction of the optical information recording-reproducing apparatus is omitted and only a signal detecting optical system in the present invention will be described.

Figure 2B:
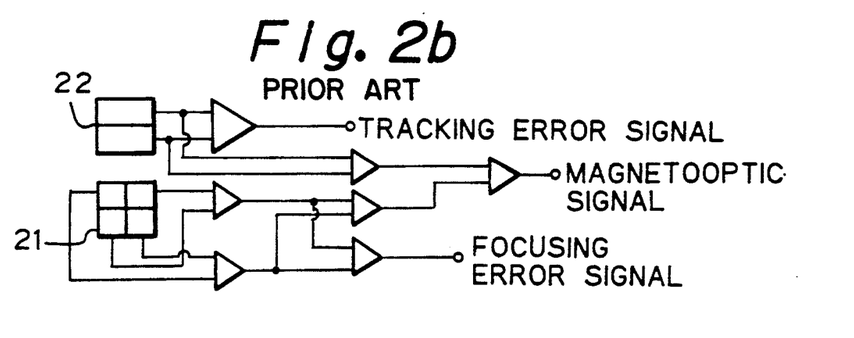

Light 223 reflected from an unillustrated magnetooptic disk as an optical information recording medium is guided to an optical information detecting optical system 224. A detecting lens 225 is arranged on an optical path of the light guided to the optical information detecting optical system 224. A dual grating 226 is disposed on an optical path of the light transmitted through this detecting lens 225. This dual grating 226 has linear diffraction gratings 227a and 227b respectively formed on the front and rear faces of a substrate 227 and having an equal pitch. The refractive index of the substrate 227 is greater than the refractive indexes of the diffraction gratings 227a and 227b. A photodetector 228 is disposed on an optical path of the light transmitted through the dual grating 226. This photodetector 228 can be constructed by combining the two-divided light-receiving element 22 and the four-divided light-receiving element 21 with each other as in the above-mentioned second proposed example shown in FIG. 2b.

The substrate 227 can be made of glass, polycarbonate, etc., and the diffraction gratings can be made of 2P resin.

In such a structure, the dual grating 226 in the present invention has the following function. The reflected light 223 from the magnetooptic disk is incident to the diffraction grating 227a on the front side of the dual grating 226 through the detecting lens 225 and is separated into zeroth order light T and first order light K. The separated lights are transmitted through the substrate 227 and are externally emitted by the diffraction grating 227b on the rear side of the substrate.

Figure 6:
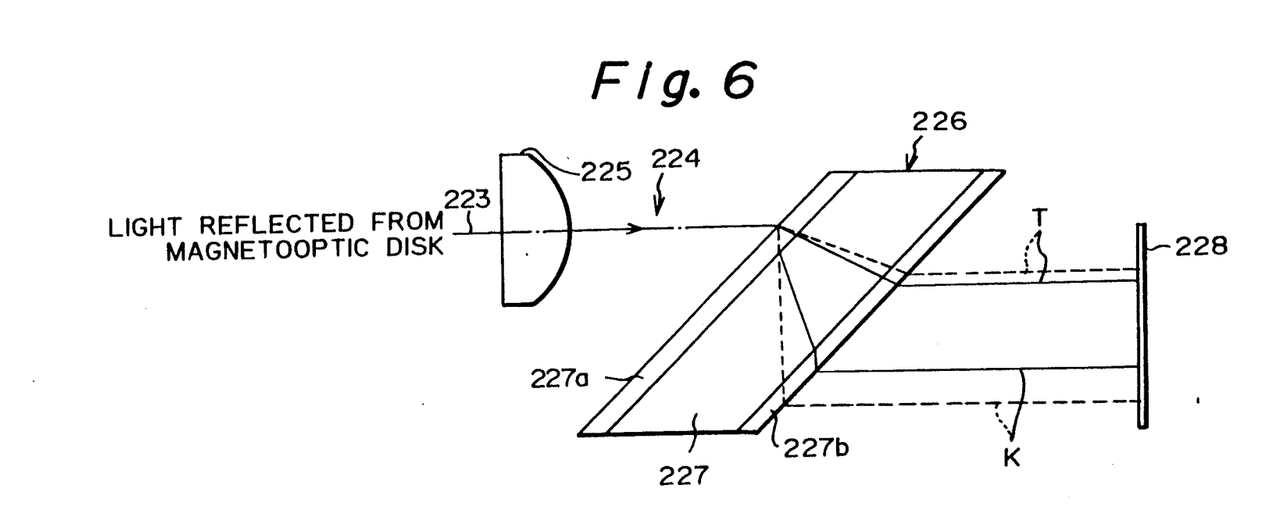
FIG. 6 is a view showing an optical path of an optical information detecting optical system in an apparatus for recording and reproducing optical information in a first embodiment of the present invention.

At this time, when the refractive index of the substrate 227 is equal to the refractive indexes of the diffraction gratings 227a and 227b, the zeroth order light T and the first order light K are transmitted along optical paths shown by broken lines in FIG. 6 so that the difference in optical path between the zeroth order light T and the first order light K is increased. However, in the present invention, the refractive index of the substrate 227 is set to be greater than the refractive indexes of the diffraction gratings 227a and 227b. Therefore, the zeroth order light T and the first order light K are transmitted along optical paths shown by solid lines in FIG. 6 so that it is possible to reduce the difference in optical path between the zeroth order light T and the first order light K. Since the difference in optical path between the zeroth order light T and the first order light K is reduced, it is unnecessary to dispose a large-sized light-receiving element on the side of the first order light as in the conventional apparatus when light-receiving elements (here, the photodetector 228) for respectively detecting the zeroth order light T and the first order light K are arranged on the same plane.

A signal is detected by using the photodetector 228 as follows. Namely, as in the second proposed example shown in FIG. 2b, the zeroth order light T is guided to the four-divided light-receiving element 21 to detect a focusing error signal by an astigmatic method. The first order light K is guided to the two-divided light-receiving element 22 to detect a tracking error signal. A magnetooptic signal can be detected by the difference in quantity of light between the zeroth order light T and the first order light K.

Figure 7:
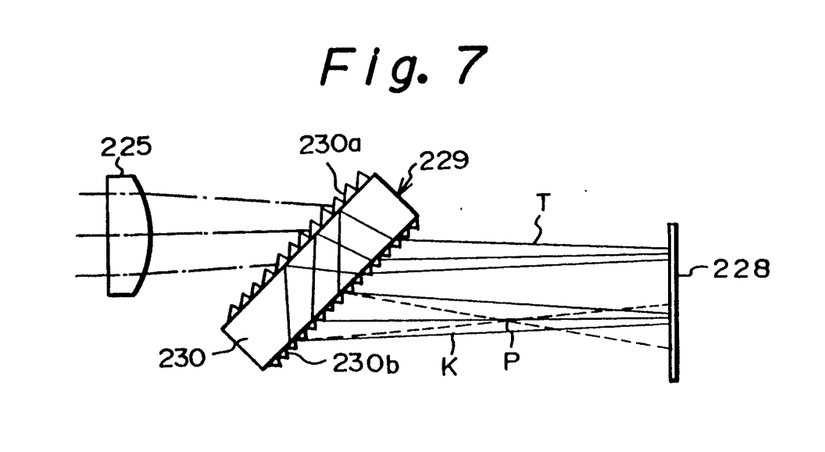
FIG. 7 is a view showing an optical path of a signal detecting optical system in an apparatus for recording and reproducing optical information in a second embodiment of the present invention.
Figure 8A:
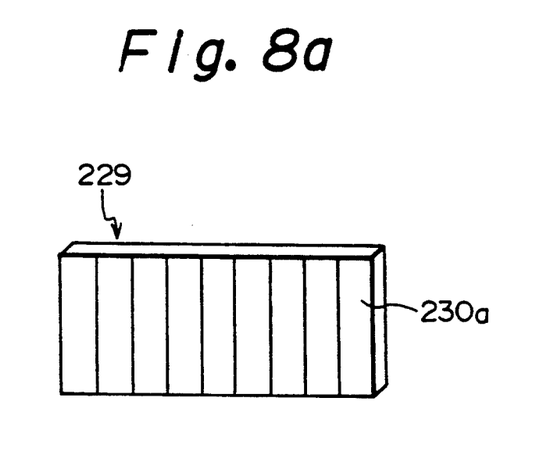
FIGS. 8a and 8b are perspective views showing the shapes of diffraction gratings formed on the front and rear faces of a dual grating in the signal detecting optical system in FIG. 7.
Figure 8B:
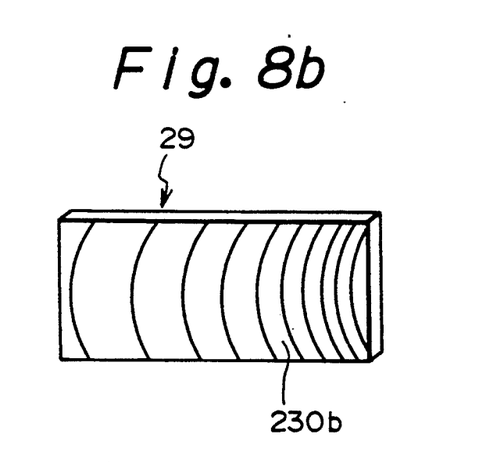

An apparatus for recording and reproducing optical information in a second embodiment of the present invention will next be described with reference to FIG. 7 and FIGS. 8a and 8b. In this embodiment, the construction of the dual grating is changed in comparison with that in the first embodiment.

A dual grating 229 has a linear diffraction grating 230a formed on the front side of a substrate 230 and having an equal pitch. The dual grating 229 also has a diffraction grating 230b formed on the rear side of the substrate 230 and having curvature at an irregular pitch. The difference in optical path between zeroth order light T and first order light K is corrected by a concave lens action of the diffraction gratings 230a and 230b.

Namely, the optical path with respect to the first order light K is longer than that with respect to the zeroth order light T and the first order light K is converged on the front side of a photodetector 228. Therefore, the first order light K is already formed as an image at a convergent point P on the front side of the photodetector 228 as shown by broken lines in FIG. 7 even when the photodetector 228 is arranged on an optimal face for detecting a focusing error signal by the zeroth order light T. As a result, the first order light K is diverged on the face of the photodetector 228. Therefore, in this embodiment, the diffraction grating 230b on the rear face of the substrate is formed at an irregular pitch to provide a concave lens action. Thus, a focal distance with respect to the first order light K converged on the front side of the photodetector 228 is increased as shown by solid lines in FIG. 7 so that the first order light K can be formed as an image on the face of the photodetector 228. Accordingly, the difference in optical path between the zeroth order light T and the first order light K can be corrected by the concave lens action provided by the irregular pitch of the diffraction grating 230b.

The focal distance provided by the concave lens action can be changed by changing the degree of the irregular pitch of the diffraction grating 230b. Accordingly, an optimal irregular pitch can be set and formed in consideration of the generated difference in optical path and the focal distance of the detecting lens.

An apparatus for recording and reproducing optical information in a third embodiment of the present invention will next be described. This embodiment is provided by combining the first and second embodiments of the present invention with each other.

Namely, in this embodiment, an unillustrated dual grating has a linear diffraction grating formed on the front face of a substrate and having an equal pitch. This dual grating also has a diffraction grating formed on the rear face of the substrate and having curvature at an irregular pitch. The refractive index of the substrate is set to be greater than the refractive indexes of the diffraction gratings. Thus, this apparatus simultaneously has two functions for correcting the difference in optical path between the zeroth order light T and the first order light K. Therefore, the correcting amount of the difference in optical path with respect to the irregular pitch is reduced so that it is possible to restrain the reduction of diffraction efficiency and increase degree of freedom with respect to design, thereby providing an optimal construction for the apparatus.

As mentioned above, in the first embodiment of the present invention, light reflected from an optical information recording medium is transmitted through a substrate having diffraction gratings formed at an equal pitch on the front and rear faces thereof such that the refractive index of the substrate is greater than the refractive indexes of the diffraction gratings. Therefore, it is possible to reduce the difference in optical path between zeroth and first order lights transmitted through this substrate. Thus, the reduction of diffraction efficiency can be prevented and it is not necessary to dispose a large-sized light-receiving element as in the conventional apparatus.

In the second embodiment of the present invention, light reflected from an optical information recording medium is transmitted through diffraction gratings formed at equal and irregular pitches on the front and rear faces of a substrate. Accordingly, it is possible to reduce the difference in optical path between zeroth and first order lights by a concave lens action provided by the diffraction grating having the irregular pitch. Thus, effects similar to those in the first embodiment of the present invention can be obtained and the apparatus can correspond to an arbitrary difference in optical path by the irregular pitch, thereby increasing degree of freedom with respect to design.

In the third embodiment of the present invention, light reflected from an optical information recording medium is transmitted through a diffraction grating having an irregular pitch and a substrate having a refractive index greater than that of this diffraction grating. Accordingly, effects similar to those in the first and second embodiments can be simultaneously obtained and it is possible to provide an optimal construction for the apparatus.

Figure 9:
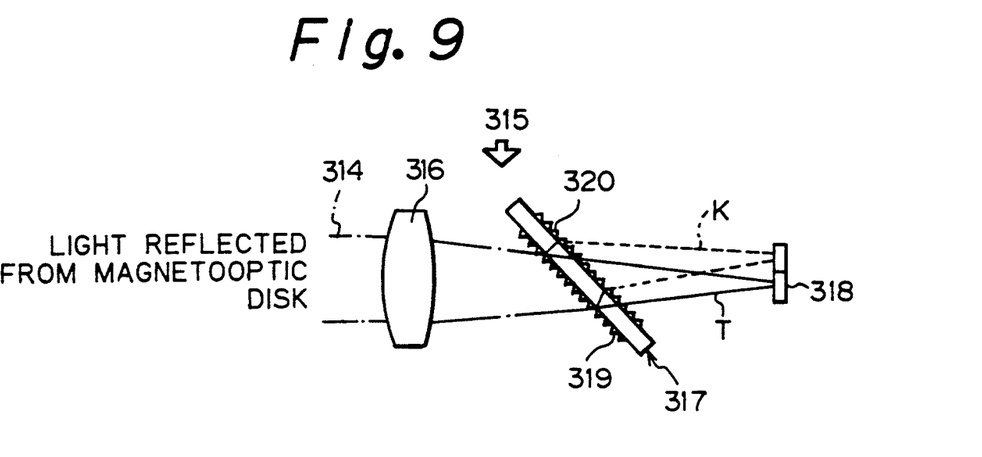
FIG. 9 is a view showing an optical path of a signal detecting optical system in an optical pickup device in a fourth embodiment of the present invention.
Figure 10:
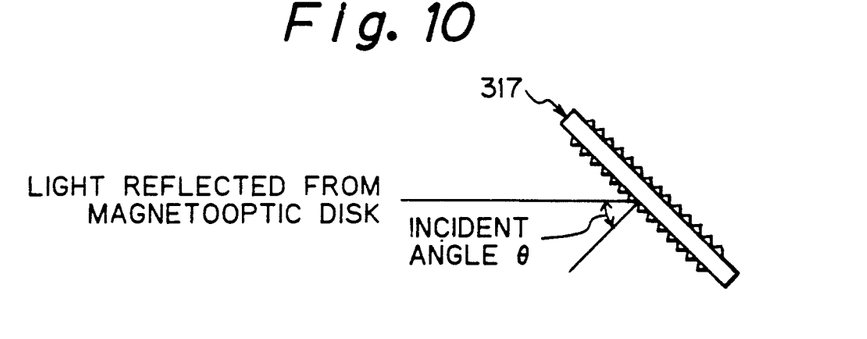
FIG. 10 is a view showing the optical path of the signal detecting optical system in FIG. 9 and the relation between a dual grating of the optical system and an incident angle of light incident to the dual grating.
Figure 11:
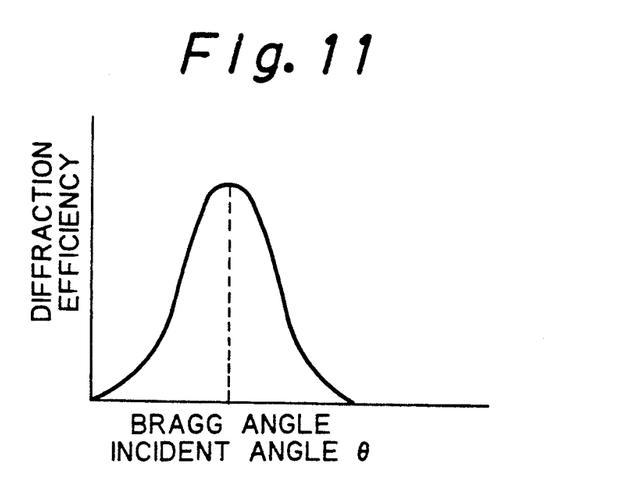
FIG. 11 is a graph showing a waveform of diffraction efficiency depending on the incident angle of the incident light in FIG. 10.

An optical pickup device in a fourth embodiment of the present invention will next be described with reference to FIGS. 9 to 11. Here, the description about the entire construction of the optical pickup device is omitted and only a signal detecting optical system in the present invention will be described.

Light 314 reflected from an unillustrated magnetooptic disk as an optical information recording medium is guided to a signal detecting optical system 315. A dual grating 317 is disposed through a condenser lens 316 on an optical path of the light guided to the signal detecting optical system 315. A light-receiving element 318 for detecting a signal is vertically divided into two sections and is disposed on an optical path of the light transmitted through the dual grating 317.

In the dual grating 317, a front face grating 319 is formed on an optical path of the above reflected light 314 on a first incident side thereof. A rear face grating 320 is formed in a position of the dual grating opposite to this front face grating 319. In this case, the pitch of the front face grating 319 is smaller than that of the rear face grating 320. Further, an incident angle of the reflected light 314 incident to the front face grating 319 is set to be greater than a Bragg angle with respect to the front face grating 319.

In such a structure, the entire operation of the signal detecting optical system 315 will next be described. The light 314 reflected from the magnetooptic disk is converged by the condenser lens 316. The converged light is then divided into light transmitted through the front and rear face gratings 319 and 320 of the dual grating 317 and light diffracted through these gratings 319 and 320. These two divided lights are received by the light-receiving element 318 so that it is possible to detect a focusing error signal, a tracking error signal and a magnetooptic signal.

The dual grating 317 in the present invention will next be described. First, the reason why the pitch of the front face grating 319 is set to be smaller than that of the rear face grating 320 is as follows. To receive the transmitted light T and the diffracted light K by the vertically two-divided light-receiving element 318, it is necessary to separate these lights from each other such that these two converged light spots do not overlap each other. Therefore, when the pitches of the front and rear face gratings 319 and 320 are set to be different from each other, optical axes of the transmitted and diffracted lights T and K are not parallel to each other. Accordingly, after the lights are transmitted through the dual grating 317, these lights are separated from each other so that it is possible to secure a distance required between the light-receiving faces of the two-divided light-receiving element 318. Further, when the pitches of the front and rear face gratings 319 and 320 are set to be equal to each other, a convergent point of the diffracted light K is located on the front side of the optical system with respect to a convergent point of the transmitted light T. Thus, the diameters of converged light spots on faces of the light-receiving element 318 are different from each other. To set the shapes of the converged light spots on the faces of the light-receiving element 318 to be equal to each other, it is necessary to adjust and set the pitches of the front and rear face gratings to be different from each other. Therefore, the pitch of the front face grating 319 of the dual grating 317 is set to be smaller than that of the rear face grating 320.

The following description relates to the reasons why the incident angle of the reflected light 314 from the magnetooptic disk with respect to the front face grating 319 is set to be greater than the Bragg angle with respect to the front face grating 319. FIG. 11 shows the relation between the diffraction efficiency and the incident angle $\theta$ with respect to the front face grating 319. In this figure, the diffraction efficiency is not reduced so much when the incident angle is slightly shifted from the Bragg angle, but the diffraction efficiency is acceleratedly reduced when the incident angle is shifted from the Bragg angle to a certain extent. If the incident angle of the reflected light 314 is equal to the Bragg angle with respect to the front face grating 319, the diffraction efficiency of the front face grating 319 has a maximum value. In such an incident state at the Bragg angle, the incident and light-emitting angles are equal to each other so that the light is incident to the rear face grating 320 at the same incident angle as that with respect to the front face grating 319. However, the Bragg angle with respect to the rear face grating 320 is different from the incident angle with respect this rear face grating so that the diffraction efficiency of the rear face grating 320 is reduced. In this case, in particular, as can be seen from the relation of FIG. 11, the diffraction efficiency of the rear face grating 320 is acceleratedly reduced as the difference between the pitches of the front and rear face gratings 319 and 320 is increased. Accordingly, the diffraction efficiency is high with respect to the front face grating 319, but is considerably low with respect to the rear face grating 320. As a result, the entire combined diffraction grating provided after the transmission of the light through the dual grating 317 is reduced.

However, in the present invention, the incident angle of the reflected light 314 with respect to the front face grating 319 is set to be a value slightly greater than the Bragg angle with respect to the front face grating 319. Therefore, the incident angle of the reflected light with respect to the rear face grating 320 is also slightly shifted from the Bragg angle with respect to the rear face grating 320. However, these shift amounts of the incident angles from the Bragg angle are small. Accordingly, from the relation of FIG. 11, the entire combined diffraction efficiency provided after the transmission of the light through the dual grating 317 can be set to be high in comparison with the case in which the above-mentioned incident angle is equal to the Bragg angle with respect to the front face grating 319. Accordingly, when the diffraction efficiency of the dual grating 317 is high as a whole, light utilization efficiency can be also set to be high. Therefore, it is possible to improve signal detection sensitivity with respect to a focusing error signal, a tracking error signal and a magnetooptic signal and stably detect these signals.

As mentioned above, in this embodiment, the light reflected from an optical information recording medium is incident to the front face grating having a pitch different from that of the rear face grating at an incident angle slightly shifted from the Bragg angle with respect to the front face grating. Accordingly, the reflected light is incident to the rear face grating in a state in which this incident angle is slightly shifted from the Bragg angle with respect to the rear face grating. Thus, the combined diffraction efficiency of the light transmitted through the dual grating can be set to be high in comparison with that in the case in which the light is incident to the gratings in a state in which the pitches of the front and rear face gratings are equal to each other and the incident angle is in conformity with the Bragg angle with respect to the front face grating. Accordingly, light utilization efficiency can be improved by increasing the diffraction efficiency of the light transmitted through the dual grating as a whole. Thus, it is possible to improve signal detection sensitivity with respect to a focusing error signal, a tracking error signal, etc., and stably detect these signals.

An apparatus for recording and reproducing optical information in a fifth embodiment of the present invention will next be described with reference to FIGS. 12 to 15. A dual type grating 425 as an optical path separating means is disposed on an optical path of light emitted from a semiconductor laser 424 as a laser beam source. In this dual type grating 425, a semi-transmission type diffraction grating 426a having an irregular pitch is formed on one face of a substrate 426 of a plane parallel plate type located on the side of the laser beam source 424. A transmission type diffraction grating 426b having an equal pitch is formed on the side of the substrate 426 opposite to the above one face thereof.

Figure 12:
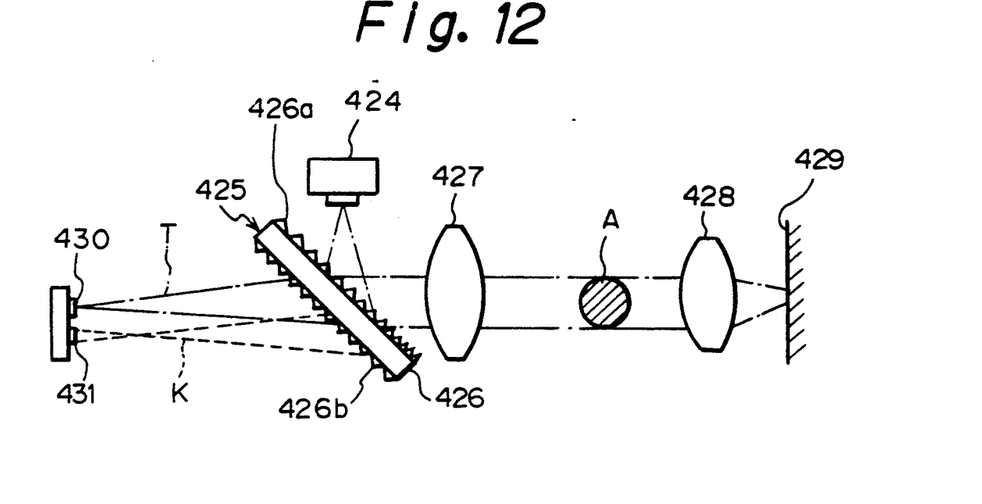
FIG. 12 is a view showing the construction of an apparatus for recording and reproducing optical information in a fifth embodiment of the present invention.

A collimator lens 427 is disposed on an optical path of the dual type grating 425 located on the side of the semi-transmission type diffraction grating 426a. A magnetooptic disk 429 as an optical information recording medium is disposed through an objective lens 428 on an optical path of the light transmitted through the collimator lens 427.

Further, a zeroth order light photodetector 430 and a first order light photodetector 431 for respectively detecting zeroth and first order lights are disposed on the same plane on an optical path of the dual type grating 425 located on the side of the transmission type diffraction grating 426b.

Figure 13:
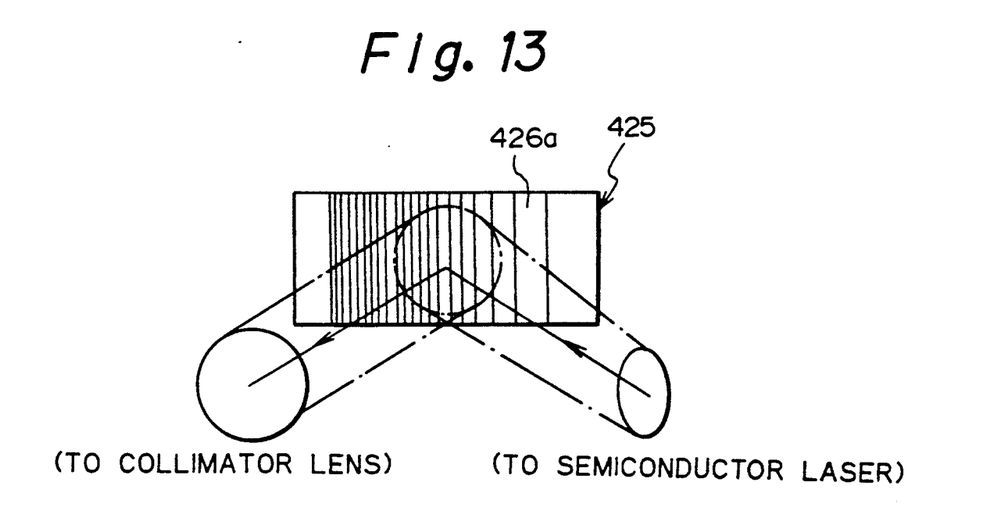
FIG. 13 is a front view showing an operating state of the apparatus in FIG. 12 in which a beam is incident onto a surface of a semi-transmission type diffraction grating.
Figure 14:
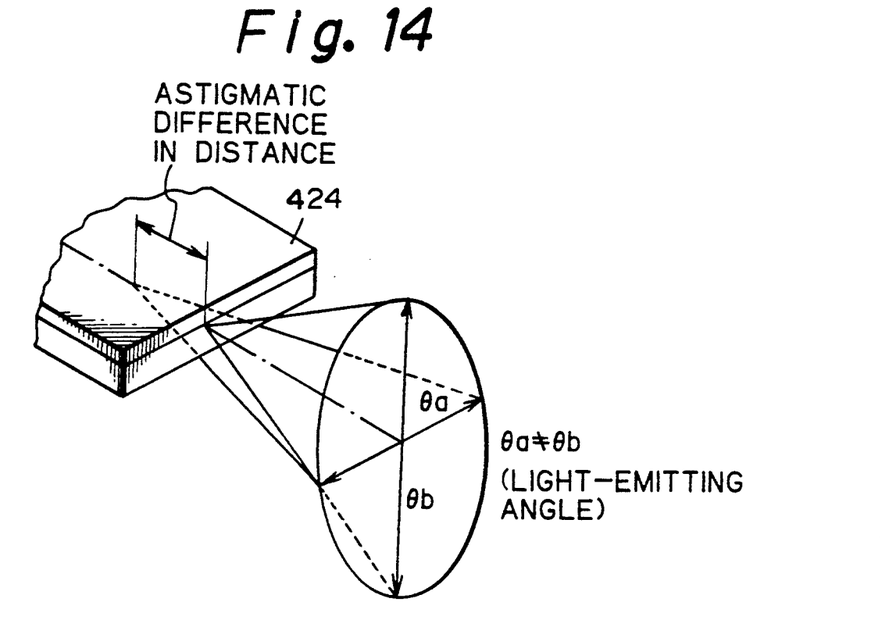
FIG. 14 is a perspective view showing an operating state of the beam emitted from a semiconductor laser.

In such a structure, diffused light having an elliptical shape is emitted from the semiconductor laser 424. As shown in FIG. 14, this diffused light is emitted in a state in which radiant angles of this light are different from each other in accordance with radiant directions thereof. This diffused light is then incident to the semi-transmission type diffraction grating 426a of the dual type grating 425. As shown in FIG. 13, this semi-transmission type diffraction grating 426a has an irregular pitch. When the diffused light is incident to this semi-transmission type diffraction grating 426a, the diffused light is corrected such that all the radiant angles of the diffused light are equal to each other. The diffused light thus corrected is transmitted through the collimator lens 427 to provide a beam shaped waveform A. In this case, the magnification in beam shaping is freely changed in accordance with the degree of the irregular pitch. The light thus formed in the shape of a beam is converged by the objective lens 428 and is irradiated onto a surface of the magnetooptic disk 429 so as to record information, etc.

Figure 15:
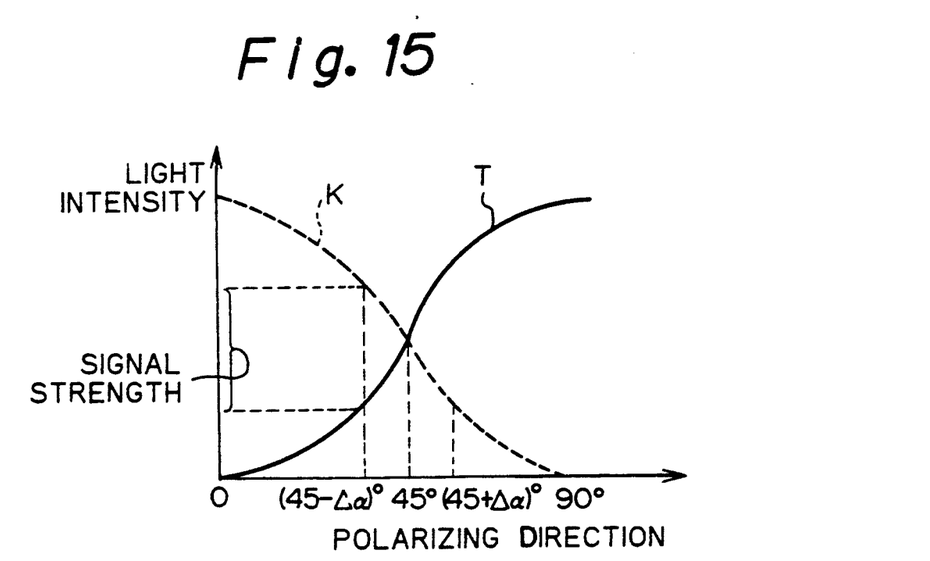
FIG. 15 is a graph showing a waveform with respect to the relation between light intensity and a polarizing direction of a high density grating.

The light reflected from the magnetooptic disk 429 is again returned and incident to the dual type grating 425 through the objective lens 428 and the collimator lens 427 from the side of the semi-transmission type diffraction grating 426a. In this case, since the semi-transmission type diffraction grating 426a is in a semi-transmission state, a portion of the reflected light incident to this diffraction grating 426a is transmitted therethrough and is separated into zeroth order light T (transmitted light) and first order light K (reflected light). These two separated lights are transmitted through the substrate 426 and are emitted from the side of the transmission type diffraction grating 426b having an equal pitch and disposed on the side of the substrate 426 opposite to the semi-transmission type diffraction grating 426a. As shown in FIG. 15, the transmission type diffraction grating 426b is constructed by a high density grating having diffraction efficiency changed in accordance with the polarizing direction of the light. Accordingly, after the light is transmitted through this grating, a difference in light intensity between the zeroth order light T and the first order light K is caused. These two lights causing this difference in light intensity are respectively detected by the zeroth order light photodetector 430 and the first order light photodetector 431.

Figure 16A:
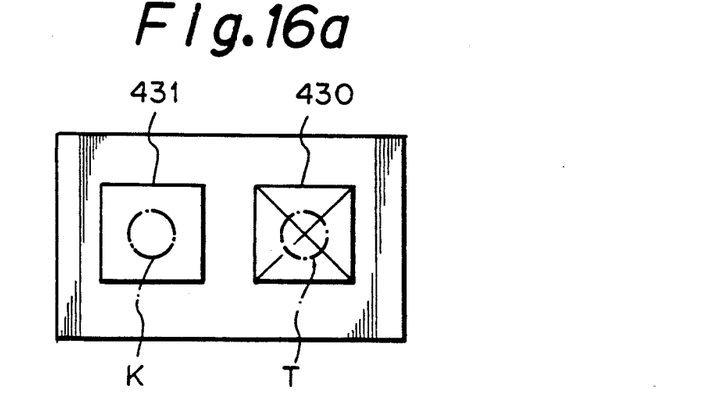
FIGS. 16a to 16c are explanatory views showing the principle for detecting a focusing error signal.
Figure 16B:
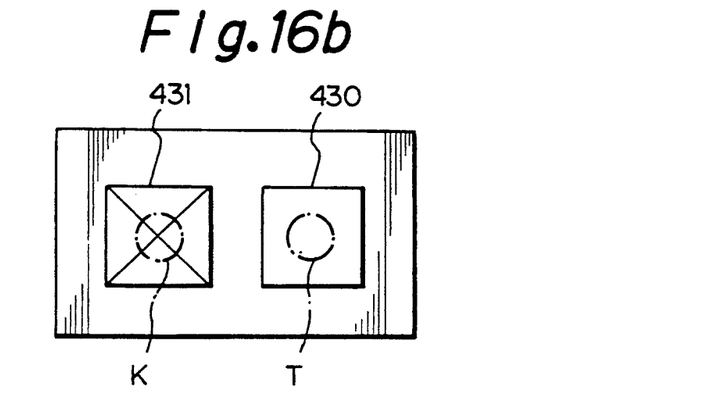
Figure 16C:
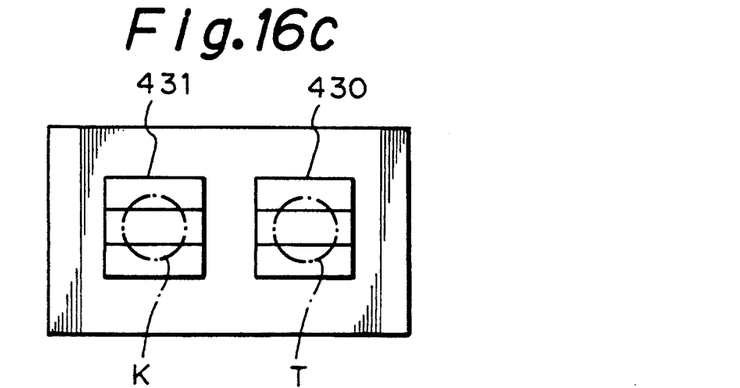

Thus, the magnetooptic signal can be detected by the difference in light intensity between the zeroth order light T and the first order light K. FIGS. 16a to 16c show various kinds of methods for detecting a focusing error signal. In FIG. 16a, astigmatism is caused by the action of the plane parallel plate with respect to the zeroth order light T and is detected by using the astigmatic method. In FIG. 16b, astigmatism is caused by the action of an irregular pitch of the diffraction grating with respect to the first order light K and is detected by using the astigmatic method. In FIG. 16c, astigmatism is detected by a beam size method by using the difference in optical path between the zeroth order light T and the first order light K and the photodetectors having three-divided light-receiving faces. Further, a tracking error signal can be detected by a known push-pull method.

As mentioned above, the dual type grating 425 has the diffraction grating 426a of the semi-transmission type formed on one side of a substrate and is disposed on the optical path of the light emitted from the semiconductor laser 424. Accordingly, it is possible to use this dual type grating instead of a beam splitter, a beam shaping prism, etc., disposed on an optical path of a lighting optical system. Therefore, the number of parts can be greatly reduced so that, similar to the general dual type grating, the change in position of a light spot on the photodetector 431 can be reduced with respect the change in wavelength of the light.

As mentioned above, in this embodiment of the present invention, an optical path separating means has a semi-transmission type diffraction grating having an irregular pitch and formed on one face of the substrate on an optical path of the light emitted from the laser beam source. The optical path separating means also has a transmission type diffraction grating formed on the other face of the substrate. Accordingly, it is unnecessary to dispose optical parts such as a beam splitter, a beam shaping prism, etc., used in the general lighting optical system. Therefore, the lighting optical system and the signal detecting optical system can be commonly constructed so that the number of parts can be greatly reduced and the entire apparatus can be made compact and light and the cost thereof can be greatly reduced in comparison with the conventional apparatus.

Many widely different embodiments of the present invention may be constructed without departing from the spirit and scope of the present invention. It should be understood that the present invention is not limited to the specific embodiments described in the specification, except as defined in the appended claims.

What is claimed is:

1. An optical apparatus for recording and reproducing information in which light emitted from a laser beam source is irradiated to an optical information recording medium so as to record information on the medium and the light reflected from the optical information recording medium passes through a detecting lens and is detected by a signal detecting optical system so as to generate a tracking error signal, a focusing error signal and a reproducing signal, said apparatus comprising:

a dual grating element, arranged between said detecting lens and said signal detecting optical system on an optical path in which the light reflected from said optical information recording medium is guided to said signal detecting optical system through the detecting lens, for separating the reflected light into a zero order light and a first order light, said dual grating element comprising a substrate having front and rear faces and diffraction gratings formed at an equal pitch on the front and rear faces, a refractive index of the substrate being greater than that of said diffraction gratings; and a photodetector for detecting the zero order light and the first order light.

2. An optical information recording-reproducing apparatus as claimed in claim 1, wherein said dual grating element shortens the optical path between the zero order light and the first order light.

3. An optical apparatus for recording and reproducing information in which light emitted from a laser beam source is irradiated to an optical information recording medium so as to record the information on the medium and the light reflected from the optical information recording medium passes through a detecting lens and is detected by a signal detecting optical system so as to generate a tracking error signal, a focusing error signal and a reproducing signal, said apparatus comprising:

a dual grating element, arranged between said detecting lens and said signal detecting optical system on an optical path in which the light reflected from said optical information recording medium is guided to said signal detecting optical system through the detecting lens, for separating the reflected light into a zero order light and a first order light, said dual grating element comprising a substrate having a diffraction grating formed at an equal pitch on one face of the substrate and a diffraction grating formed at an irregular pitch on the other face of the substrate, a refractive index of the substrate being greater than that of said diffraction gratings; and a photodetector for detecting the zero order light and the first order light.

4. An optical pickup device for irradiating light emitted from a laser beam source to an optical information recording medium so as to record and reproduce information, said optical pickup device guiding the light reflected from said optical information recording medium through a condenser lens to a signal detecting optical system so as to generate a focusing error signal, a tracking error signal and a reproducing signal, said device comprising:

a dual grating element arranged between said condenser lens and said signal detecting optical system on an optical path of said reflected light guided through the condenser lens to said signal detecting optical system;

a front face grating formed in the dual grating element on a first incident side of said reflected light;

a rear face grating formed in the dual grating element on the side thereof opposite to said first incident side; and a light-receiving element for detecting transmitted light and diffracted light separated by said dual grating;

the front face grating having a pitch smaller than that of the rear face grating, and an incident angle of said reflected light with respect to said front face grating being set to be greater than a Bragg angle with respect to the front face grating.

5. An optical pickup device as claimed in claim 4, wherein the light reflected from the optical information recording medium is incident on the front face grating at an incident angle shifted from the Bragg angle with respect to the front face grating.

6. An optical pickup device as claimed in claim 5, wherein the reflected light is incident on the rear face grating in a state in which the incident angle is shifted from a Bragg angle with respect to the rear face grating.

7. An optical apparatus for recording and reproducing information in which light emitted from a laser beam source is converged by an objective lens to form a light spot and is irradiated to an optical information recording medium so as to record information on the medium and the light reflected from said optical information recording medium is detected by a signal detecting optical system so as to generate a tracking error signal, a focusing error signal and a reproducing signal, said apparatus comprising:

a dual grating element arranged on an optical path along which the light emitted from said laser beam source is guided to said optical information recording medium, having a semi-transmission type diffraction grating with an irregular pitch and formed on one face of a substrate located on the side of said laser beam source and a transmission type diffraction grating formed on the other side of the substrate and having an equal pitch, the diffraction efficiency of the transmission type diffraction grating varying depending on a polarizing direction of the light;

a collimator lens disposed on an optical path between said dual grating element and said optical information recording medium; and a photodetector disposed on an optical path along which the light reflected from said optical information recording medium is transmitted through said dual grating element, said photodetector detecting a zero order light and a first order light separated by transmitting the reflected light through the dual grating element.

8. An optical information recording-reproducing apparatus as claimed in claim 7, wherein a difference in light intensity is caused with respect to the zero order light and the first order light transmitted through the transmission type diffraction grating.

* * * * *